United States Patent [19]

Browder

[11] Patent Number: 4,654,837
[45] Date of Patent: Mar. 31, 1987

[54] MAGNETO-OPTIC TRANSDUCER WITH ENHANCED SIGNAL PERFORMANCE

[75] Inventor: Lewis B. Browder, Port Hueneme, Calif.

[73] Assignee: Datatape Incorporated, Pasadena, Calif.

[21] Appl. No.: 773,284

[22] Filed: Sep. 6, 1985

[51] Int. Cl.$^4$ .................. G11B 5/127; G11B 11/10; G11B 7/12
[52] U.S. Cl. .................................... 369/13; 360/114; 360/59; 365/121
[58] Field of Search ............... 360/114, 59; 369/13; 365/121, 122

[56] References Cited

U.S. PATENT DOCUMENTS

| | | | |
|---|---|---|---|
| 3,465,322 | 9/1969 | Stapper, Jr. | 340/174.1 |
| 3,474,431 | 2/1966 | Griffiths | 360/114 |
| 3,626,394 | 12/1971 | Nelson et al. | 340/174.1 |
| 3,636,535 | 1/1972 | Cushner et al. | 340/174.1 |
| 3,665,431 | 5/1972 | Alstad et al. | 340/174.1 |
| 3,739,362 | 6/1973 | Eschelbach | 340/174.1 |
| 4,228,473 | 10/1980 | Himuro et al. | 360/114 |

Primary Examiner—Raymond F. Cardillo
Assistant Examiner—Hoa T. Nguyen
Attorney, Agent, or Firm—Dennis P. Monteith

[57] ABSTRACT

A magneto-optic transducer for providing an optical indication of variations in magnetization in a magnetic storage medium located along a predetermined path. The transducer has a thin film of magneto-optic material with an edge positionable closely adjacent the storage medium path so that the magneto-optic film is magnetized in accordance with the magnetization in the storage medium. The magneto-optic film is supported such that polarized light projected along an incident optical path, convergent with the storage medium path at an acute angle, intercepts the magneto-optic film substantially normally and is reflected back generally along the incident optical path.

3 Claims, 5 Drawing Figures

U.S. Patent  Mar. 31, 1987  Sheet 1 of 2  4,654,837
FIG 1
(PRIOR ART)
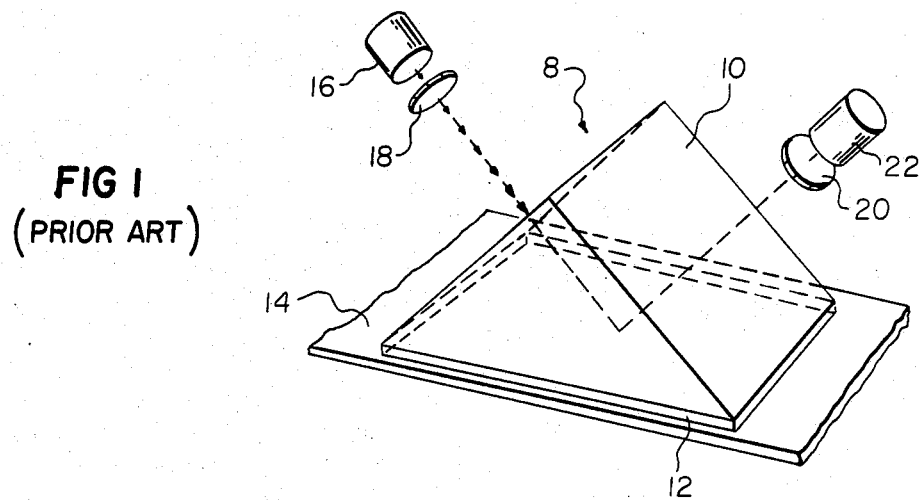
FIG 2
(PRIOR ART)
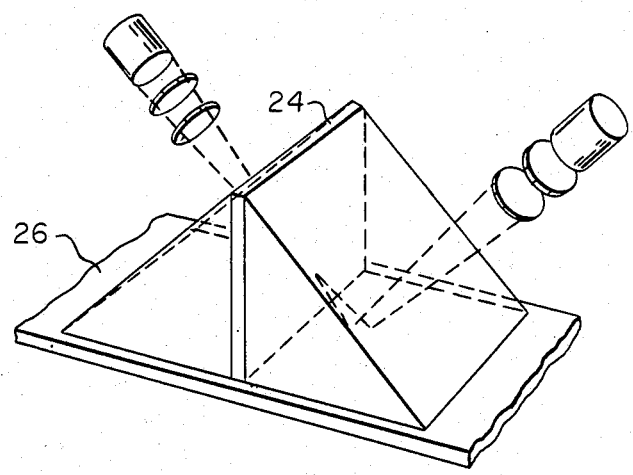
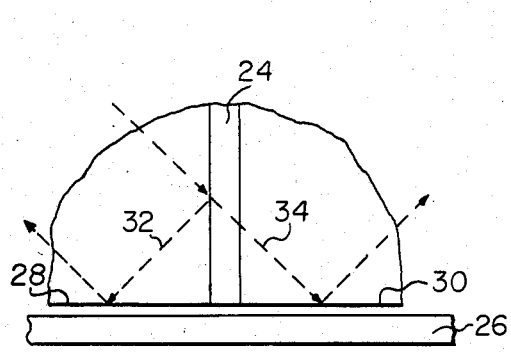
FIG 3 (PRIOR ART)
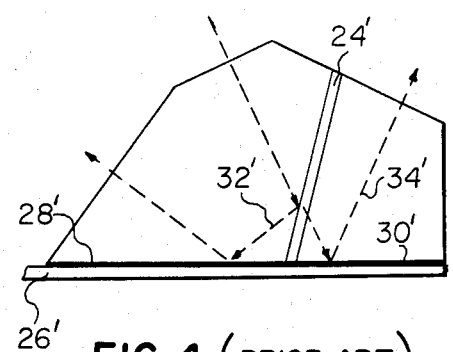
FIG 4 (PRIOR ART)

MAGNETO-OPTIC TRANSDUCER WITH ENHANCED SIGNAL PERFORMANCE

BACKGROUND OF THE INVENTION

1. Field of the Invention

This invention relates generally to a magneto-optic transducer for providing an optical indication of information magnetically recorded on a magnetic storage medium, and more particularly to novel geometry for such a transducer.

2. Description of the Prior Art

In the following description of the prior art, reference is made to FIGS. 1 through 4 of the accompanying drawings, in which:

FIG. 1 is a perspective view of a magneto-optic transducer known in the prior art;

FIGS. 2 and 3 are perspective and detailed elevational views, respectively, of a second magneto-optic transducer known in the prior art; and FIG. 4 is an elevational view of a third magneto-optic transducer known in the prior art.

Magneto-optic transducers for providing an optical indication of information recorded on a magnetic storage medium are known in the prior art. A thin film of magneto-optic material is magnetized corresponding to magnetic fields produced by an adjacent magnetic storage medium. A beam of polarized light irradiates the magneto-optic material which causes amplitude variable, plus-or-minus rotation of the plane of polarization of the light, depending upon the strength and direction of magnetization of the material. The so-called Kerr effect occurs when light is reflected from a film of magnetized magneto-optic material, and the light has its plane of polarization rotated. When polarized light passes through magnetized magneto-optic material, the plane of polarization rotates by an amount proportional to the thickness traversed by the light and to the magnetic field strength. This is the Faraday effect. A light-responsive device is used to detect these optical variations.

FIG. 1 illustrates a Kerr effect type magneto-optic transducer 8 in accordance with the prior art. A prism 10 has a thin film 12 of magneto-optic material coated on the bottom face thereof. Light from a source 16 passes through a polarizer 18. As magnetic tape 14 moves under prism 10, thin film 12 of magneto-optic material is magnetized, and is "read out" by reflecting the polarized light off the magneto-optic material film and passing the reflected light through an analyzer 20 to a photodetector 22.

Two problems are known to occur with the prior art device shown in FIG. 1. Thin film of magneto-optic material is subject to wear because of moving contact with magnetic tape 14, and the resolution of the device is limited by the size of the light beam reflected off of the film of magneto-optic material. That is, the light beam generally has a cross-sectional dimension in the order of microinches. Accordingly, the smallest dimension of magnetization that can be resolved by such a beam is only in the order of microinches.

These problems of wear and resolution are not present in the prior art devices shown in FIGS. 2–4, and disclosed in U.S. Pat. No. 3,665,431 which issued on May 23, 1972 to J. K. Alstad et al. The Alstad et al. patent teaches a magneto-optic transducer with a thin film 24 (24') of magneto-optic material normal to magnetic tape 26 (26'). Since only an edge of the magneto-optic material film is immediately adjacent the magnetic tape, and that edge is transverse to tape movement, resolution is effectively equal to the film thickness. The thin film of magneto-optic material is supported between wear resistant glass prisms with reflective inner faces 28 and 30 (28' and 30') adjacent magnetic tape 26 (26'). The portion 32 (32') of the light beam reflected from film 24 (24') (Kerr effect) and the portion 34 (34') of the light beam refracted by the magneto-optic film (Faraday effect) is reflected from inner faces 28 and 30 (28' and 30'), respectively, and directed through analyzers to photodetectors.

Signal loss during playback of a magnetic storage medium is proportional to the separation between the thin film of magneto-optic and the storage medium, and the separation is itself proportional to the radius of curvature of the storage medium about the contacting edge of the thin film of magneto-optic material. The requirement of the Alstad et al. device for reflective faces 28 and 30 limits the angle of wrap about the edge of the thin film of magneto-optic material.

SUMMARY OF THE INVENTION

It is an object of the present invention to reduce signal loss by providing a magneto-optic transducer with a thin film of magneto-optic material arranged to minimize wear and optimize resolution.

In accordance with the above, the present invention includes a magneto-optic transducer for providing an optical indication of variations in magnetization in a magnetic storage medium located along a predetermined path. The transducer has a thin film of magneto-optic material with an edge positionable closely adjacent the storage medium path so that the magneto-optic film is magnetized in accordance with the magnetization in the storage medium, thereby allowing the generation of a greater contact force between the storage medium and the transducer by permitting an angle of wrap about the transducer. The magneto-optic film is supported such that polarized light projected along an incident optical path convergent with the storage medium path at an acute angle intercepts the magneto-optic film substantially normally and is reflected back generally along the incident optical path.

The invention and its other advantages will become more apparent in the detailed description of preferred embodiments presented below.

BRIEF DESCRIPTION OF THE DRAWINGS

In the detailed description of preferred embodiments presented herein, reference is made to the accompanying drawings, in which:

FIG. 1 is a perspective view of a known magneto-optic transducer;

FIGS. 2 and 3 are perspective and detailed elevational views, respectively, of a second magneto-optic transducer known in the art;

FIG. 4 is an elevational view of a third magneto-optic transducer known in the art.

DETAILED DESCRIPTION OF PREFERRED EMBODIMENTS

Figure 5:
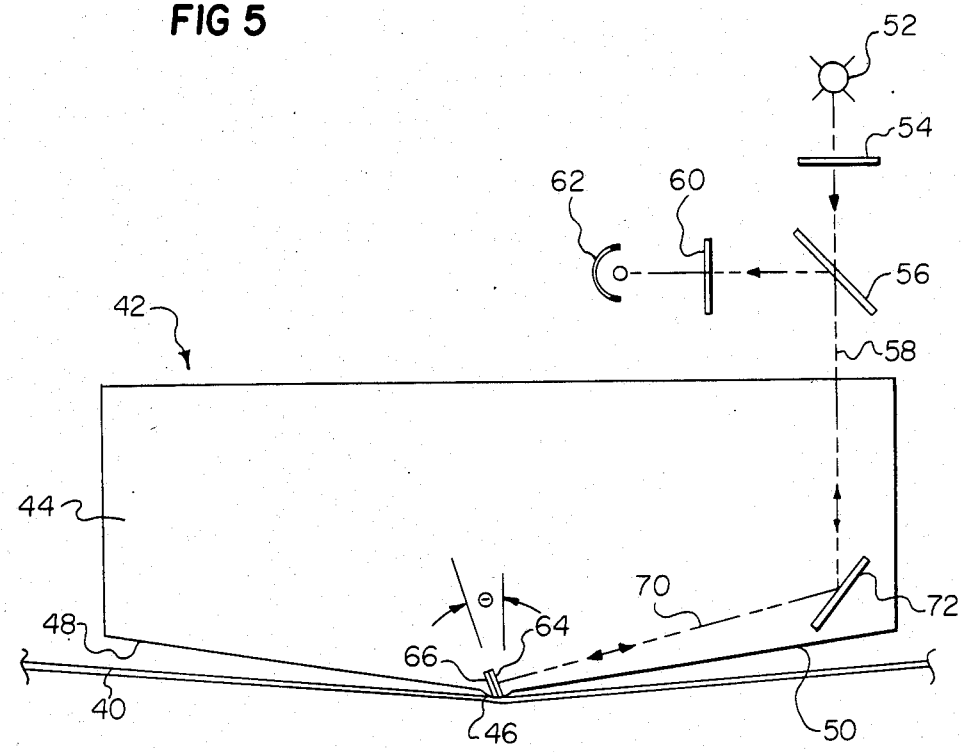
FIG. 5 is a side elevational view of a magneto-optic transducer in accordance with the present invention, in association with a magnetic storage medium and an illumination and light-analysis system.

Because magneto-optic transducers are well known, the present description will be directed in particular to elements forming part of, or cooperating directly with, apparatus in accordance with the present invention. It is to be understood that elements not specifically shown or described may take various forms well known to those skilled in the art.

Referring to FIG. 5, the illustrated preferred embodiment of the invention includes magneto-optic apparatus for reading information from a magnetic storage medium 40. Medium 40 may be a magnetic tape, disk, drum or the like.

A magneto-optic transducer 42 consists of a body portion 44 supported such that magnetic storage medium 40 moves across a radius tip 46 from which flare two substantially straight sections 48 and 50, each at an angle of about 5° to the plane normal to the end of radius tip 46. This allows the generation of a greater contacting force between the magnetic storage medium and the radius tip of body portion 44 by permitting an angle of wrap about the tip of up to about 10°.

Light produced by a source 52 passes through a polarizer 54 and a beam splitter 56, and enters transducer 42 along optical axis 58. Light emerging from the transducer along optical path 58 is reflected off beam splitter 56 through an analyzer 60 to an optical sensor such as photodetector 62 for sensing changes in polarization of the light emitted from the transducer. The light paths and optical elements are shown schematically in FIG. 5, and it is understood that alternative configurations would be apparent to one skilled in the art. For example, the optical path could be a fiber optic link.

The geometric problem of delivering the incident light to the magneto-optic element and conducting the modulated light away therefrom, while at the same time allowing the magnetic storage medium to wrap around the transducer to insure intimate physical contact between the medium and the magneto-optic element has been solved by the present invention. As shown in FIG. 5, magneto-optic transducer 42 includes a thin film of magneto-optic material on a support 66. The thickness of thin film 64 is preferably on the order of a few hundred angstroms, and for clarity is not shown to scale in the drawings.

Support 66 is situated such that the edge of magneto-optic film 64 is at radius tip 46, whereby the contact force between magnetic storage medium 40 and the edge of the magneto-optic film is enhanced. As mentioned above, straight sections 48 and 50 flare at an angle of approximately 5°. This angle would interfere with the optical axis of light which intersects the magneto-optic film normally were it not for the fact that support 66 has been inclined at an angle of somewhat greater than 5° to the axis of symmetry of the radius tip. As such, light projected along an incident optical path 70 which is convergent with the path of magnetic storage medium 40 intercepts magneto-optic film 64 substantially normally to the magneto-optic film and near its edge to enhance the signal-to-noise ratio. Upon interception with the magneto-optic film, the incident light is modulated in accordance with magnetization in the magneto-optic material, and the modulated light is reflected generally back along optical path 70. Mirror 72 redirects the light to beam splitter 56. The mirror is situated clear of the path of magnetic storage medium 40.

For multi-track applications, sensor 62 may include multiple sensor elements, each of which corresponds to a particular track of recorded information. The output signal of the sensor is applied to electronic playback equipment including, for example, a playback amplifier and means for displaying or processing the played-back information in a conventional manner.

As mentioned in the "Description of the Prior Art" section hereof, magneto-optic transducers may be of the Kerr effect or the Faraday effect type. Again, the Kerr effect occurs when light is reflected from a film of magnetized magneto-optic material, and the Faraday effect occurs when light passes through such material. Magneto-optic material 64 shown in FIG. 5, may be either Kerr or Faraday effect type. If the material is Kerr effect type, light reflected therefrom will have its plane of polarization rotated, and the analyzer and photodetector are used to detect the rotation. If the magneto-optic material is of the Faraday effect type, support 66 is provided with a mirror reflecting surface such that light passing through the magneto-optic material is reflected back through that material, to mirror 72, and then to beam splitter 56.

The invention has been described in detail with particular reference to preferred embodiments thereof but it will be understood that variations and modifications can be effected within the spirit and scope of the invention.

I claim:

1. A magneto-optic transducer for providing an optical indication of variations in magnetization in a magnetic storage medium located along a predetermined path, said transducer comprising:
    a body portion for contacting the storage medium along the path, said body portion having a radius tip adjacent the storage medium path and a section extending from said radius tip in a direction divergent from the storage medium path;
    a thin film of magneto-optic material having an edge positioned at said radius tip so that said magneto-optic film is magnetized in accordance with the magnetization in the storage medium adjacent said radius tip;
    means for directing polarized light along an incident optical path convergent with said body portion section and the storage medium path at an acute angle; and
    means for supporting said magneto-optic film such that the incident polarized light intercepts said magneto-optic film substantially normally, is modulated in accordance with magnetization in said magneto-optic material, and is reflected generally back along said incident optical path.

2. A magneto-optic transducer as defined in claim 1 wherein said thin film of magneto-optic material is of the Kerr effect type, whereby polarized light intercepting said magneto-optic film is reflected therefrom and has its plane of polarization rotated.

3. A magneto-optic transducer as defined in claim 1 wherein said thin film of magneto-optic material is of the Faraday effect type, and further comprising a reflective surface on said supporting means, whereby polarized light intercepting said magneto-optic film passes through said magneto-optic film, has its plane of polarization rotated, is reflected from said surface, and repasses through said magneto-optic film.

* * * * *